(12) United States Patent
Meyer et al.

(10) Patent No.: US 9,287,705 B2
(45) Date of Patent: Mar. 15, 2016

(54) METHOD AND APPARATUS FOR CONTACTLESS TRANSMISSION OF ELECTRICAL ENERGY BETWEEN A WALL AND A DOOR LEAF FASTENED TO THIS WALL

(75) Inventors: Eckhard Meyer, Korschenbroich (DE); Walter Hahn, Moenchengladbach-Wickrath (DE)

(73) Assignee: DR. HAHN GMBH & CO. KG, Moenchengladbach-Wickrath (DE)

( * ) Notice: Subject to any disclaimer, the term of this patent is extended or adjusted under 35 U.S.C. 154(b) by 477 days.

(21) Appl. No.: 13/995,952

(22) PCT Filed: Sep. 29, 2011

(86) PCT No.: PCT/EP2011/066998
§ 371 (c)(1),
(2), (4) Date: Jun. 20, 2013

(87) PCT Pub. No.: WO2012/045658
PCT Pub. Date: Apr. 12, 2012

(65) Prior Publication Data
US 2014/0001878 A1    Jan. 2, 2014

(30) Foreign Application Priority Data
Dec. 22, 2010 (DE) .......................... 10 2010 061 471

(51) Int. Cl.
*H01F 27/42* (2006.01)
*H02J 3/00* (2006.01)
(Continued)

(52) U.S. Cl.
CPC ............... *H02J 3/00* (2013.01); *E05D 11/0081* (2013.01); *H01F 38/18* (2013.01); *H02J 5/005* (2013.01);
(Continued)

(58) Field of Classification Search
CPC ............ E05D 11/0081; E05Y 2400/66; E05Y 2800/424; H02J 5/005; H02J 3/00; H01F 38/18
USPC ........................................................ 307/104
See application file for complete search history.

(56) References Cited

U.S. PATENT DOCUMENTS 4,808,973 A * 2/1989 Siev ....................... G08B 13/08
340/531
2007/0063586 A1    3/2007 Neidlein
(Continued)

FOREIGN PATENT DOCUMENTS

| CN | 1879265 A | 12/2006 |
|---|---|---|
| CN | 101573851 A | 11/2009 |

(Continued)

OTHER PUBLICATIONS

Machine translation of DE 102004017341 A1; Wolfgang Staude; Jan. 2005.*

(Continued)

*Primary Examiner* — Jared Fureman
*Assistant Examiner* — Duc M Pham
(74) *Attorney, Agent, or Firm* — Norman B. Thot

(57) ABSTRACT

A method for a contactless transmission of electrical energy includes providing a leaf fastened to a wall. The leaf is hingedly mounted about a hinge axis. Providing a hinge plate pin. Providing a primary power coil fastened to the wall. Providing a secondary power coil fastened to the leaf. The primary power coil and the secondary power coil are in an inductive operative connection with each another via the hinge plate pin. Detecting an actual secondary power voltage induced in the secondary power coil. Comparing the actual secondary power voltage with a setpoint value of the secondary power voltage. Influencing a primary power applied to the primary power coil based on the comparison of the setpoint value and the actual secondary power voltage. Detecting the primary power required to achieve the setpoint value of the secondary power voltage. Triggering a signal when a predetermined primary power is exceeded.

9 Claims, 10 Drawing Sheets

(51) Int. Cl.
*E05D 11/00* (2006.01)
*H01F 38/18* (2006.01)
*H02J 5/00* (2006.01)

(52) U.S. Cl.
CPC .......... *E05Y 2400/66* (2013.01); *E05Y 2800/00* (2013.01); *E05Y 2800/424* (2013.01); *E05Y 2800/426* (2013.01); *E05Y 2900/132* (2013.01)

(56) References Cited

U.S. PATENT DOCUMENTS

| | | | |
|---|---|---|---|
| 2009/0015210 A1 | 1/2009 | Kojima | |
| 2010/0171369 A1 | 7/2010 | Baarman et al. | |
| 2012/0017396 A1* | 1/2012 | Meyer | E05D 5/14 16/386 |
| 2014/0021911 A1 | 1/2014 | Baarman et al. | |

FOREIGN PATENT DOCUMENTS

| | | |
|---|---|---|
| DE | 39 15 812 A1 | 11/1990 |
| DE | 43 22 811 A1 | 2/1994 |
| DE | 20 305 769 U1 | 10/2003 |
| DE | 10 2004 017 341 A1 | 1/2005 |
| DE | 20 2008 014 318 U1 | 4/2010 |
| EP | 0 316 872 A2 | 5/1989 |
| EP | 0 451 445 A2 | 10/1991 |
| WO | WO 2010/049292 A1 | 5/2010 |

OTHER PUBLICATIONS

Machine translation of DE 3915812 A1; Oscar von Wedekind et al.; Nov. 1990.*

* cited by examiner

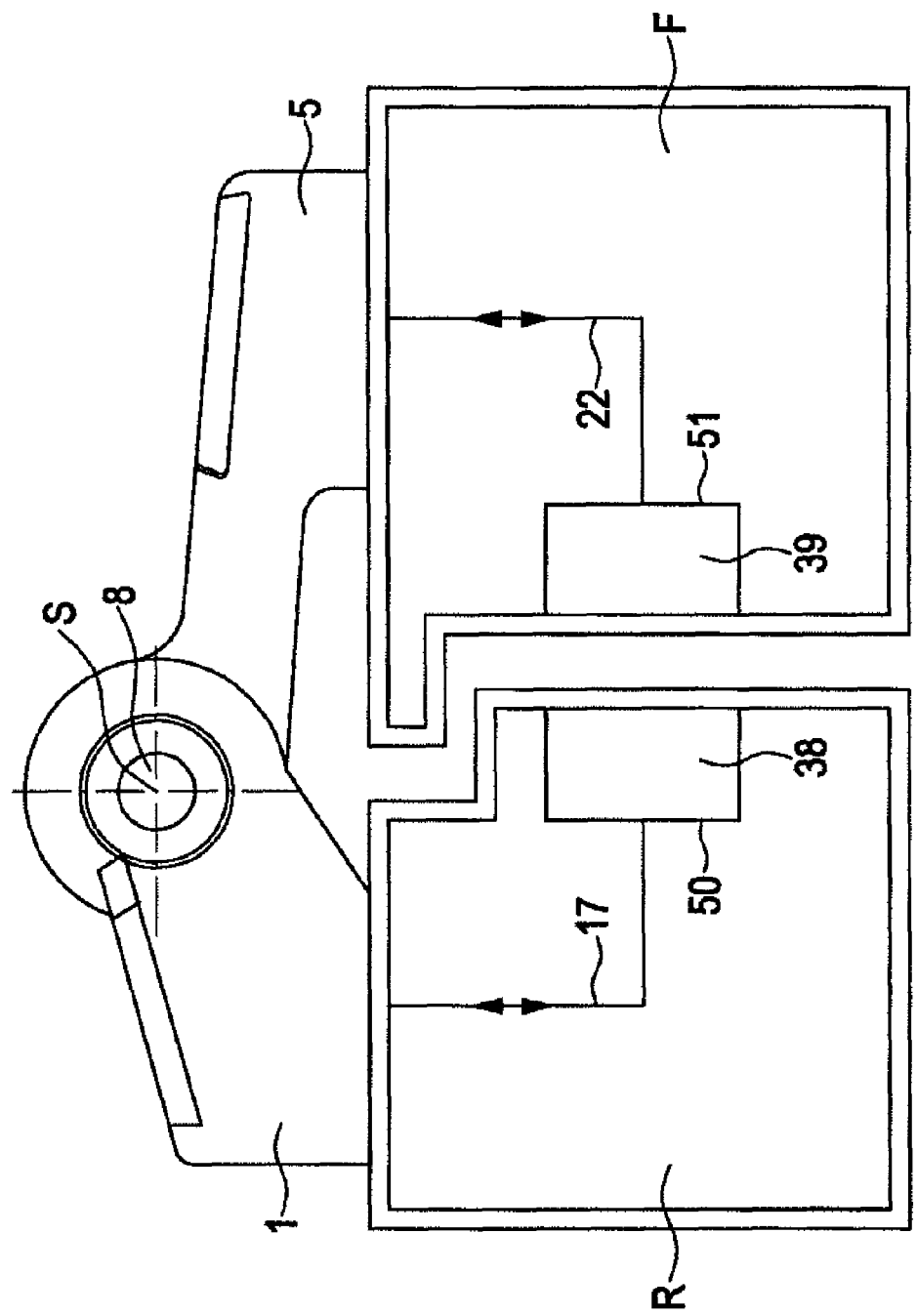

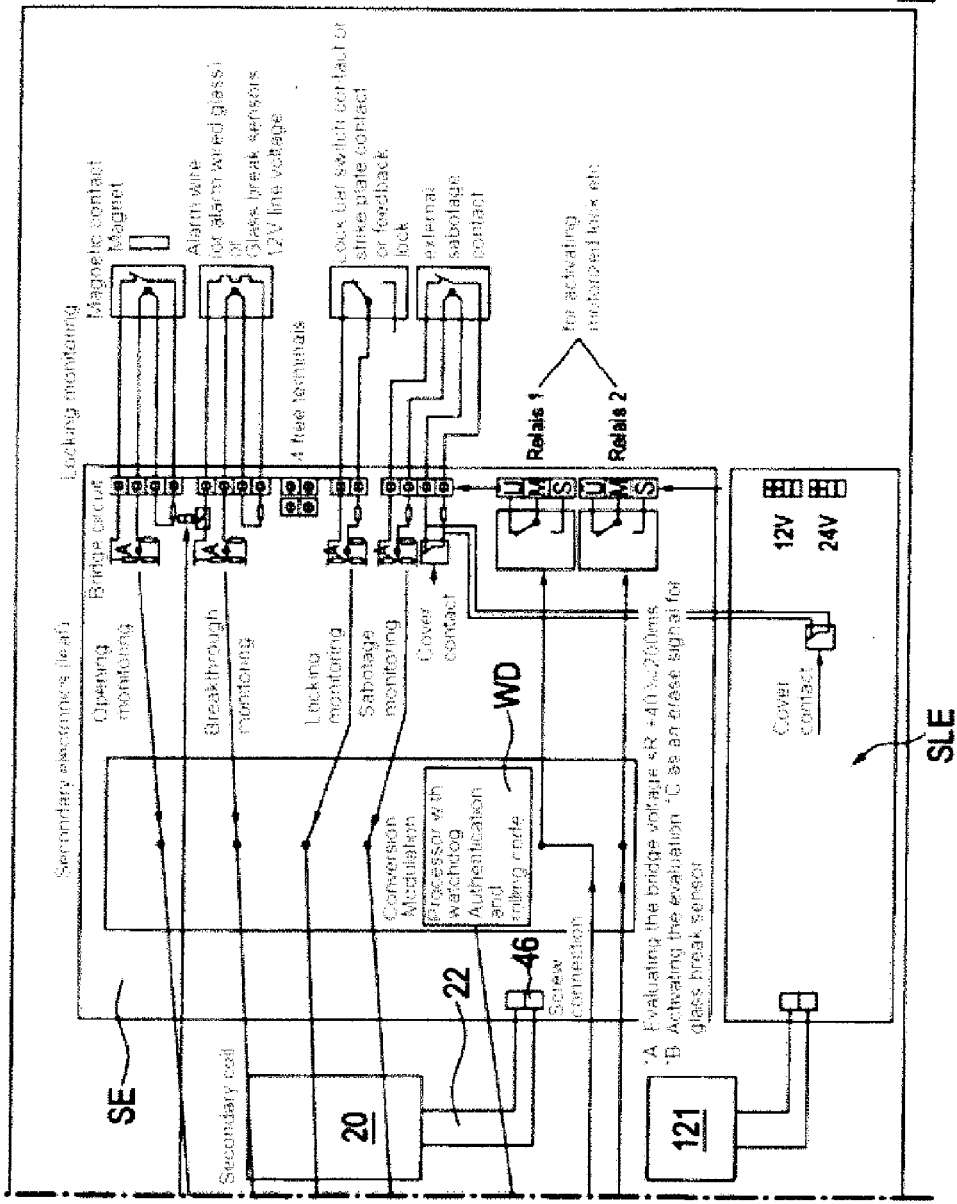

METHOD AND APPARATUS FOR CONTACTLESS TRANSMISSION OF ELECTRICAL ENERGY BETWEEN A WALL AND A DOOR LEAF FASTENED TO THIS WALL

CROSS REFERENCE TO PRIOR APPLICATIONS

This application is a U.S. National Phase application under 35 U.S.C. §371 of International Application No. PCT/EP2011/066998, filed on Sep. 29, 2011 and which claims benefit to German Patent Application No. 10 2010 061 471.8, filed on Dec. 22, 2010. The International Application was published in German on Apr. 12, 2012 as WO 2012/045658 A1 and as WO 2012/045658 A9 on Apr. 12, 2012 under PCT Article 21(2).

FIELD

The present invention relates to a method and an apparatus for the contactless transmission of electrical energy between a wall and a door leaf fastened to this wall so as to be hingedly mounted about a hinge axis, in which a primary power coil fastened to the wall and a secondary power coil fastened to the leaf are provided and are in inductive operative connection to one another by means of a hinge plate pin.

BACKGROUND

Leafs of doors for objects such as houses, stores or production halls increasingly comprise devices which improve security or comfort, and the respective current operating state and actuation of which is monitored or actuated by monitoring or actuating devices arranged outside of the door, and which transmit operating state changes or signals potentially received by sensors to the monitoring or actuating devices.

An example thereof is an intrusion alarm control which is installed in a building and which communicates with devices provided on the door, for example, for opening, breakthrough, locking, sabotage or motor lock monitoring.

For transmitting corresponding signals and electric power between the monitoring device and the devices located on the door, the prior art describes multicore cables which are laid in a flexible manner and are frequently surrounded by a flexible metal tube for protection.

These cable transitions significantly affect the visual appearance. They can furthermore get pinched when closing the door leaf which can result in damage to the cables or even destruction of the cables. The cable transitions are moreover weak points with regard to manipulations, for which reason a so-called Z-wiring of sensors or contacts is also implemented in the cable transition.

DE 10 2004 017 341 A1 describes a hinge plate with an integrated transformer for contactless energy transmission. This hinge plate comprises a primary coil arranged in a frame hinge plate part and a secondary coil arranged in the leaf hinge plate part. An iron core that penetrates both coils and at the same time forms the hinge plate pin serves to magnetically couple the secondary coil to the primary coil, which coils are spaced apart from one another in the direction of the hinge axis.

Although contactless transmission of electrical energy and/or electrical signals between a wall and a door leaf fastened to this wall is principally possible with this arrangement, a continuous formation of this Z-wiring for this inductive energy and/or signal transmission is not possible and therefore affects sabotage protection.

SUMMARY

An aspect of the present invention is to provide an improved method for sabotage protection and an apparatus for carrying out this method for the contactless transmission of electrical energy between a wall and a door leaf fastened to the wall, in which a primary coil fastened to the wall and a secondary coil fastened to the door leaf are provided and are in inductive operative connection to one another.

In an embodiment, the present invention provides a method for a contactless transmission of electrical energy between a wall and a leaf fastened to the wall which includes providing a leaf fastened to a wall. The leaf is configured so as to be hingedly mounted about a hinge axis. Providing a hinge plate pin. Providing a primary power coil fastened to the wall. Providing a secondary power coil fastened to the leaf. The primary power coil and the secondary power coil are configured so as to be in an inductive operative connection with each another via the hinge plate pin. Detecting an actual secondary power voltage induced in the secondary power coil. Comparing the actual secondary power voltage with a setpoint value of the secondary power voltage. Influencing a primary power applied to the primary power coil based on the comparison of the setpoint value and the actual secondary power voltage. Detecting the primary power required to achieve the setpoint value of the secondary power voltage. Triggering a signal when a predetermined primary power is exceeded.

BRIEF DESCRIPTION OF THE DRAWINGS

The present invention is described in greater detail below on the basis of embodiments and of the drawings in which:

FIG. 2 schematically shows the arrangement according to FIG. 1 in a state attached to a frame profile and a leaf profile which is connected to the frame such that it is hingedly mounted about a hinge axis;

DETAILED DESCRIPTION

Figure 1:
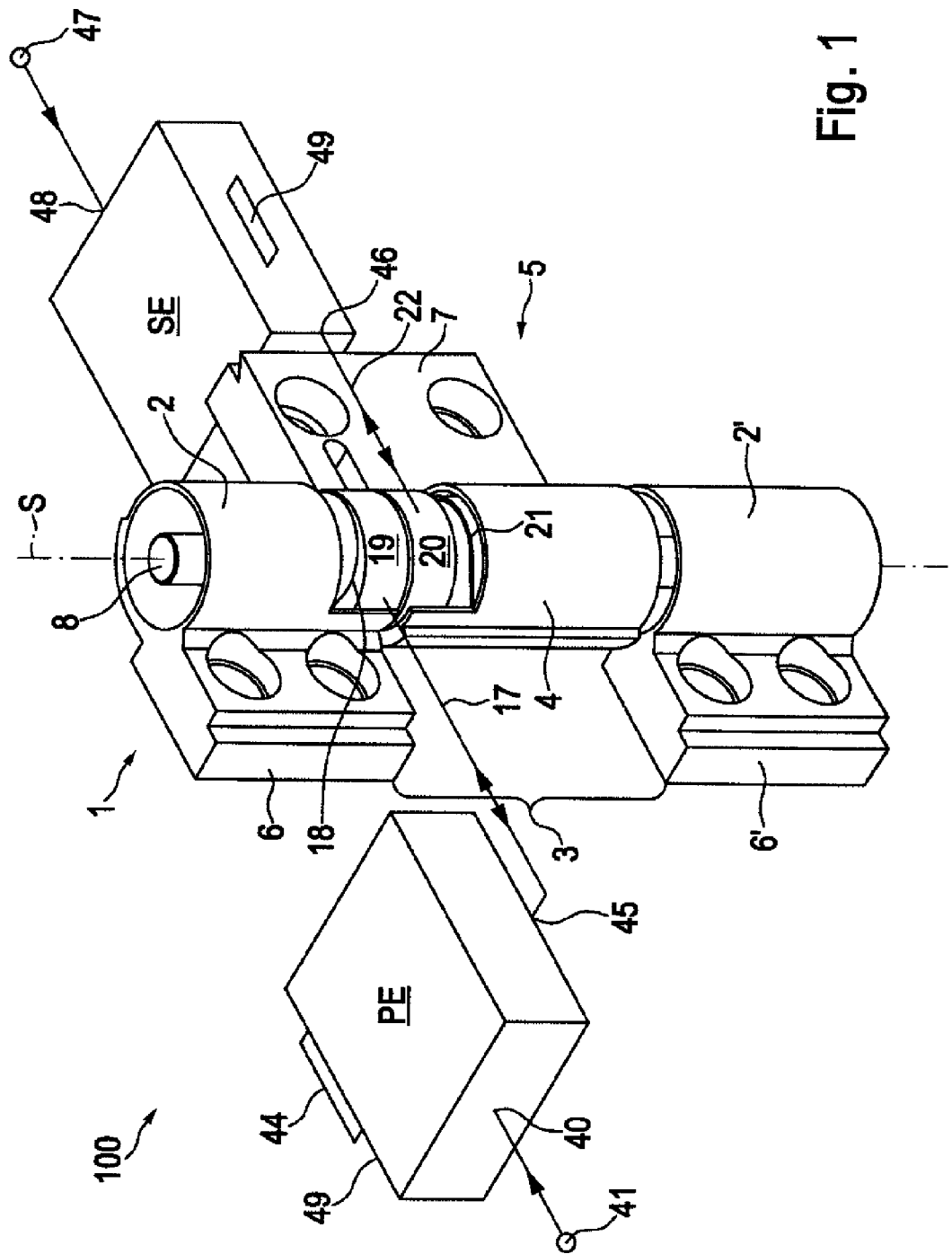
FIG. 1 schematically shows a device according to the present invention in a partially outlined illustration of the hinge plate and door leaf parts in a perspective view, with schematically indicated primary and secondary electronics.

With the method according to the present invention, the secondary power voltage induced in the secondary power coil is detected and is compared with a predefined setpoint value which is usually predefined by the operating voltage of the leaf-side electrical consumer loads. The primary power applied to the primary power coil is influenced, for example, controlled, by means of the secondary power voltage setpoint value/actual value comparison. If the actual value of the secondary power voltage lies below the setpoint value, the primary power is increased until the actual value of the secondary voltage corresponds to the setpoint value.

Influencing the primary power can take place, for example, by influencing the primary voltage or, for example, by pulse width modulation. The primary voltage can, for example, have a certain constant voltage value and the primary power can be influenced by changing the duty cycle, for example, between 50/50 (maximum power) and 10/90 (minimum power).

The primary power value required for achieving the setpoint value of the secondary power voltage is determined. A signal is triggered upon exceeding a predetermined primary power value. The signal can serve, for example, to activate an alarm system.

The method according to the present invention is based on the surprising finding that even small changes of the position of the hinge plate pin result in such a great change of the inductive resistance of the primary and secondary power coils that, for the induction of a certain actual secondary power value, a significantly increased primary power is required. The sudden increase of the required primary power can thus indicate a sabotage or burglary attempt that is detected by the method according to the present invention.

In an embodiment of the present invention, the detected secondary power voltage value can, for example, be converted into an electrical signal that is modulated depending on the voltage value, and the secondary power coil can, for example, be acted on with this signal. A secondary power-voltage-dependent signal is thereby induced in the primary power coil, which signal, when demodulated, can be used for influencing, for example, controlling the primary power.

In an embodiment of the present invention, the apparatus according to the present invention for the contactless transmission of electrical energy between a wall and a door leaf fastened to this wall so as to be hingedly mounted about a hinge axis comprises a primary power coil that can be fastened to the wall, a secondary power coil that can be fastened to the door leaf, and a hinge plate pin that serves as a magnetic flux guide element between the primary power coil and the secondary power coil. According to the present invention, a modulator is provided at the secondary side, which modulator acts on the secondary power coil with a secondary-voltage-dependent modulated, for example, an amplitude-modulated signal. A demodulator is furthermore provided at the primary side, which demodulator demodulates the signal that is induced in the primary power coil due to the secondary-voltage-dependent modulated signal and relays it to a device for influencing, for example, controlling the primary power. A device for determining a setpoint/actual value deviation of the secondary power voltage is furthermore provided which is operatively connected to the device for influencing the primary power and activates the same in the sense of a setpoint/actual value comparison. The apparatus according to the present invention finally comprises a device which, upon exceeding a predetermined primary power, triggers a signal since (as described above) an increasing difference between the primary and the secondary power voltages can indicate a sabotage or burglary attempt that includes a displacement of the hinge plate pin.

In an embodiment of the present invention, the device according to the present invention can, for example, comprise a switching regulator and/or a pulse width modulator for influencing the primary power.

In an embodiment of the present invention, a primary power electronics can, for example, be provided which moreover has a primary power processor that serves at least to determine the setpoint/actual value deviation of the secondary power voltage.

A rectifier converting the secondary power voltage induced in the secondary coil into direct-current voltage can furthermore be provided if the consumer loads at the door leaf are operated with direct-current voltage. For the purpose of transmitting the actual direct-current value, the rectifier can, for example, be connected to the secondary power processor.

The secondary power processor can moreover be operatively connected to the modulator for the purpose of activating according to the actual direct-current voltage value.

The primary power electronics can furthermore comprise an inverter. The apparatus is then suitable for connecting to a direct-current voltage source on the wall, for example, to a direct-current output of an emergency-power-buffered power supply unit of an alarm system.

For improving the operational reliability, the primary power electronics can comprise a low-pass filter for filtering out interfering frequencies.

If the primary and secondary power coils also serve for bidirectional signal or data transmission in the apparatus according to the present invention, or separate first and second coils are present for this purpose, the primary power coil or the first coil can be acted on with at least one first control signal within a certain time interval, and the at least one first signal induced in the secondary power coil or in the second coil can be detected.

In the above-mentioned time interval, the second coil is furthermore acted on with at least one second control signal, and the at least one second signal induced in the first coil is also detected. An interference signal is generated if, with this bidirectional signal transmission, a coil is not acted on with at least a portion of the expected control signals, or if at least a portion of the induced signals expected due to the control signals is not detected in the coils. Sabotage protection is significantly improved by the method according to the present invention if this interference signal is transmitted, for example, to an intrusion alarm control for triggering an alarm. The interference signal can, however, also be relayed to a so-called "watchdog" so as to avoid triggering false alarms during the occurrence of a technical malfunction.

If "first" and "second" coils are mentioned hereinafter, alternatively, primary and secondary power coils are also meant in each case.

Tests have shown that signal interferences can occur in individual cases during the bidirectional transmission and detection of the control signals and the induced signals. In order to avoid that such an interference in each case results in triggering an alarm, the first and the second coils can, for example, each be acted on with two control signals within said time interval. The interference signal is only generated if the two control signals or the two induced second signals are not acting or are not detected. In other words, an interference signal is only triggered if two successive control signal cycles are identified as faulty.

In an embodiment of the method of the present invention, after generating the induced signal, the first or the second coil can, for example, be acted on with a response control signal which, in turn, generates an induced signal in the respective other coil.

The time interval in which signals correlated with each other are generated or detected can, for example, be between 10 ms and 500 ms, for example, approximately 60 ms.

A control signal and an associated response control signal can, for example, be generated within a time period of 20 ms to 100 ms, for example, of approximately 40 ms.

The control signal can be of any kind that enables generating a signal in an inductive manner in the respective other coil. The control signal and also the response control signal can, for example, be generated by modulating a carrier voltage. All known methods for modulating signals can thereby be considered. For bidirectional transmission, the carrier voltage can, for example, be amplitude-modulated by the control signal, and the response control signal can be frequency-modulated. The control signal can, for example, be generated at the door leaf and the response control signal can, for example, be generated at the wall.

The carrier frequency of the carrier voltage depends on the configuration of the coil system. In the case of a coil system with housings and cores comprising MnZn ferrites (depending on the MnZn material) carrier frequencies of 20 kHz to 2 MHz can be used. It is also conceivable to use air coils. In this case, the carrier frequencies can also be higher.

In order to also increase the protection against complex sabotage methods which, for example, include inductively coupling a sabotage coil to the first coil instead of the second coil provided at the door leaf, a refinement of the method provides querying the value of a control resistor arranged at the door leaf within the time interval. The control resistor value can be copied and digitalized and rolling-coded by an alarm group at the door leaf and can be transmitted to the primary side. A further sabotage barrier is thereby created since, for inductively coupling, for the purpose of decoupling the leaf-side coil, the resistor value would also have to be known and the corresponding signal would have to be generated.

The query value of the control resistor can be transmitted to the first coil through modulation of the carrier voltage applied to the second coil and can then be compared with a setpoint value. A second interference signal can then be used, for example, for triggering an alarm if the determined value exceeds a certain, still permissible difference from a reference value. Tests have shown that for reducing the risk of a false alarm, the difference of approximately 40% of the resistor value is well suited as a threshold value.

In order to make the possibility of sabotage significantly more difficult even in the case that the person planning the act of sabotage knows the resistor value, the first and second coils can, for example, be acted on at least with encoded control signals and response control signals.

The possibility of decoding by unauthorized persons is once again made difficult if, for example, the control signal and the response control signal are encoded by means of a rolling code.

In order to further improve security against sabotage, the method can comprise the method step of mutual authentication of a primary electronics electrically connected to the first coil, and a secondary electronics connected to the second coil.

In an embodiment of the present invention, the apparatus for carrying out the above-described method comprises a first coil provided on a wall, a second coil provided on a leaf, wherein the first and second coils are in an inductive operative connection to one another, a primary electronics connected to the first coil and a secondary electronics connected to the second coil, wherein the primary and secondary electronics comprise means for generating and detecting control signals and response control signals.

In an embodiment of the present invention, the primary and secondary control electronics can, for example, comprise means for modulating a carrier voltage with the control signals. The secondary electronics can, for example, comprise an amplitude modulator and the primary electronics can, for example, comprise a frequency modulator.

In an embodiment of the present invention, means for authenticating the primary and secondary electronics can, for example, be provided.

In order that the primary and secondary electronics cannot be reached without destruction when the door leaf is closed, the primary and secondary electronics each comprise a housing suitable for installation in a frame profile or in a leaf profile, in particular in profile recesses on the sides that face one another when the door leaf is closed.

In an embodiment of the present invention, the housings can, for example, be shielded in order to avoid, on the one hand, interferences of the primary or secondary electronics through external electrical magnetic fields and, on the other, to prevent electromagnetic radiation from escaping from the housings.

In order to prevent the electronics components from overheating, which components are provided in the housings and usually develop a certain amount of heat, the housings can, for example, be made of a thermally conductive material, and for simplifying the production, they can, for example, be made of a thermally conductive plastic material.

The primary and secondary electronics can, for example, furthermore comprise modems for an 8-bit encoding and decoding of signals and control signals to be transmitted. With the aid of these modems, it is possible to modulate analog signals submitted, for example, by the devices and sensors provided on the door leaf, and to transmit them without being sensitive to interferences. The primary and secondary electronics can furthermore each comprise a BUS system to which in each case a plurality of sensors can be connected. Transmitting the measured values or operating states provided by means of the sensors can then take place serially after modulation and demodulation, for example, by using protocols which, for example, can comply with the RS 485 standard.

The present invention shall hereinafter be further explained based on an exemplary embodiment illustrated in the drawings.

The apparatus, as whole designated by 100 in the drawing, is visually based on a so-called three-piece hinge plate. Said apparatus (if necessary) can have a supporting hinge function at the same time, and can thus replace a conventional hinge. It can alternatively serve for a contactless transmission of electrical energy and/or electrical signals and be provided in addition to conventional hinges on a leaf/wall arrangement.

The apparatus 100 comprises a hinge plate part 1 which serves for fixing on a stationary/leaf frame R. It has two hinge parts 2, 2' that are spaced apart from one another by a clearance space 3 in the longitudinal direction of a hinge axis S.

In the clearance space 3 between the upper hinge part 2 and the lower hinge part 2', the hinge part 4 of a leaf part 5 is arranged which, in the exemplary embodiment illustrated in the drawings, is attached to a leaf frame F. For fastening, the hinge plate part 1 comprises hinge plate part fastening parts 6, 6', and the leaf part 5 comprises a leaf fastening part 7.

The hinge axis S is defined by a hinge plate pin 8 penetrating the hinge parts 2, 2' and 4, which hinge plate pin 8 penetrates the hinge parts in hinge plate pin receptacles, which are not shown in the drawings for clarity reasons, in a manner known per se.

Provided in the upper hinge part 2 of the hinge plate part 1 is a first electrical coil 19 on which (according to FIG. 1) a downwardly acting spring force of a helical spring 18 acts.

The first electrical coil 19 is connected to a primary electronics PE by means of a multicore, for example, a shielded, electrical line 17.

A second electrical coil 20 is inserted in the hinge part 4 of the leaf part 5 and is acted on by means of a helical spring 21 with an upwardly directed spring force according to FIG. 1. The first and second electrical coils 19, 20 rest against one another under the action of the helical springs 18, 21.

The second electrical coil 20 is connected to a secondary electronics SE via a multicore, for example, a shielded electrical line 22.

Figure 3A:
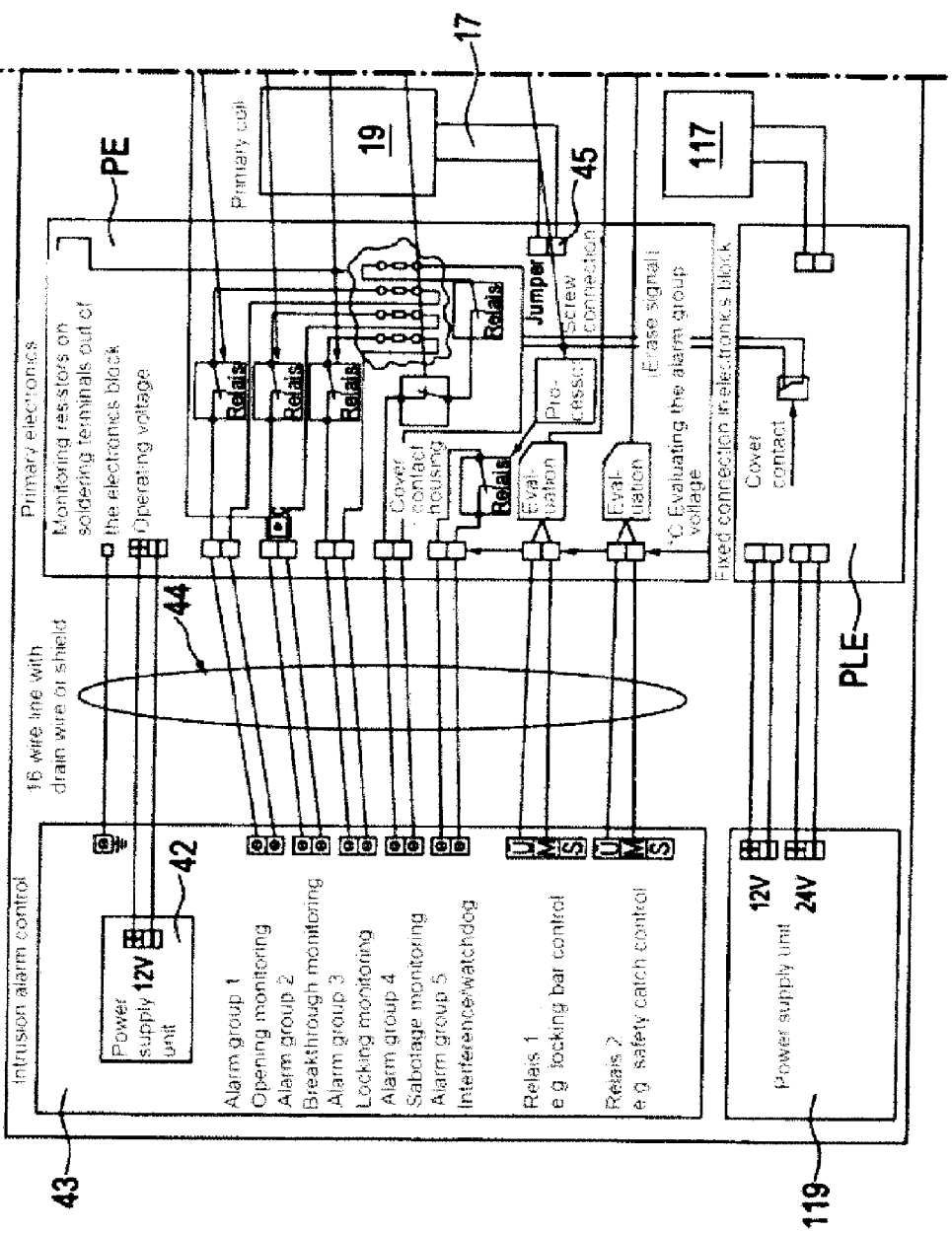
FIG. 3 shows an overall block diagram of the apparatus.
Figure 4:
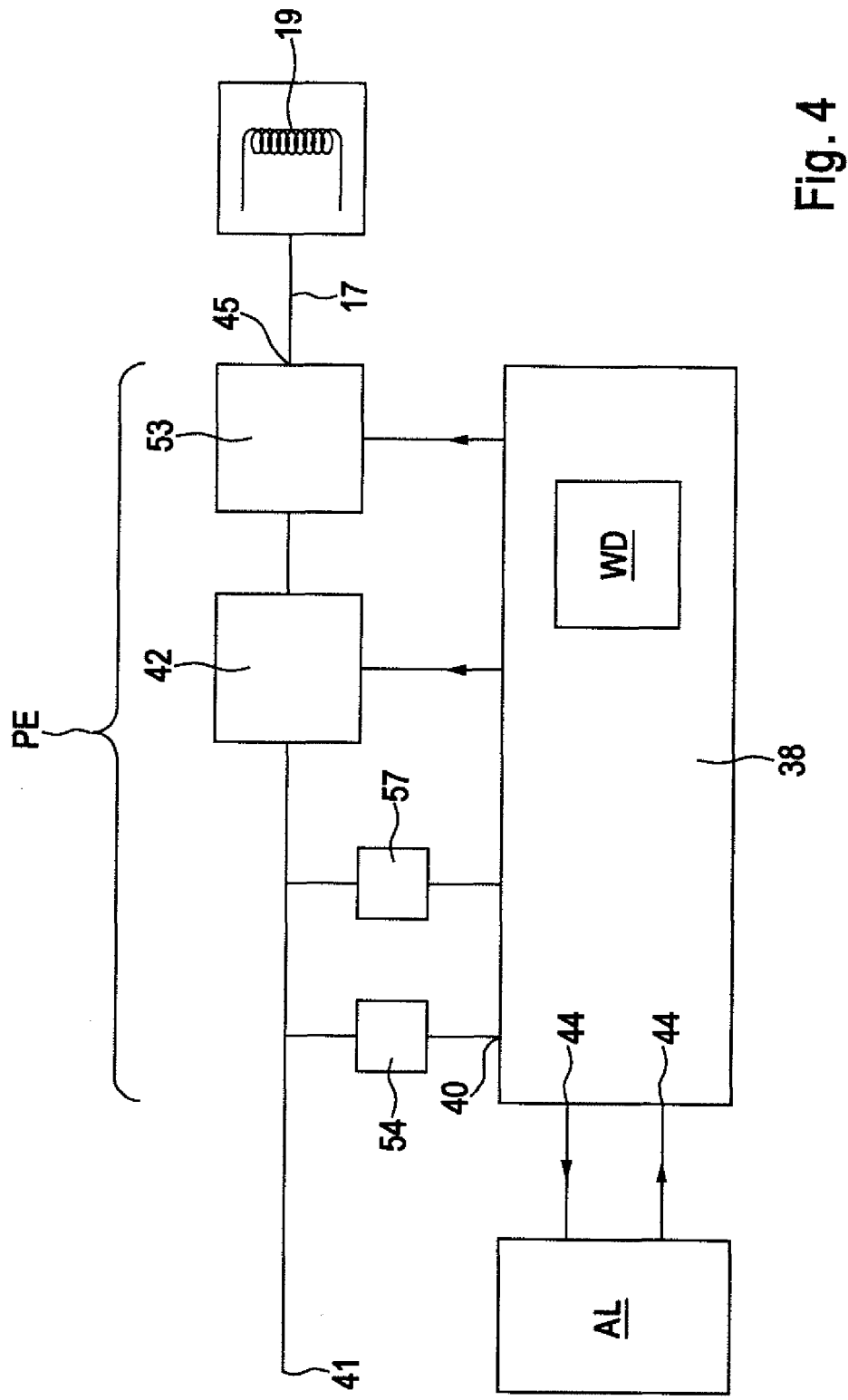
FIG. 4 shows a block diagram of the frame-side primary electronics of the apparatus.
Figure 5:
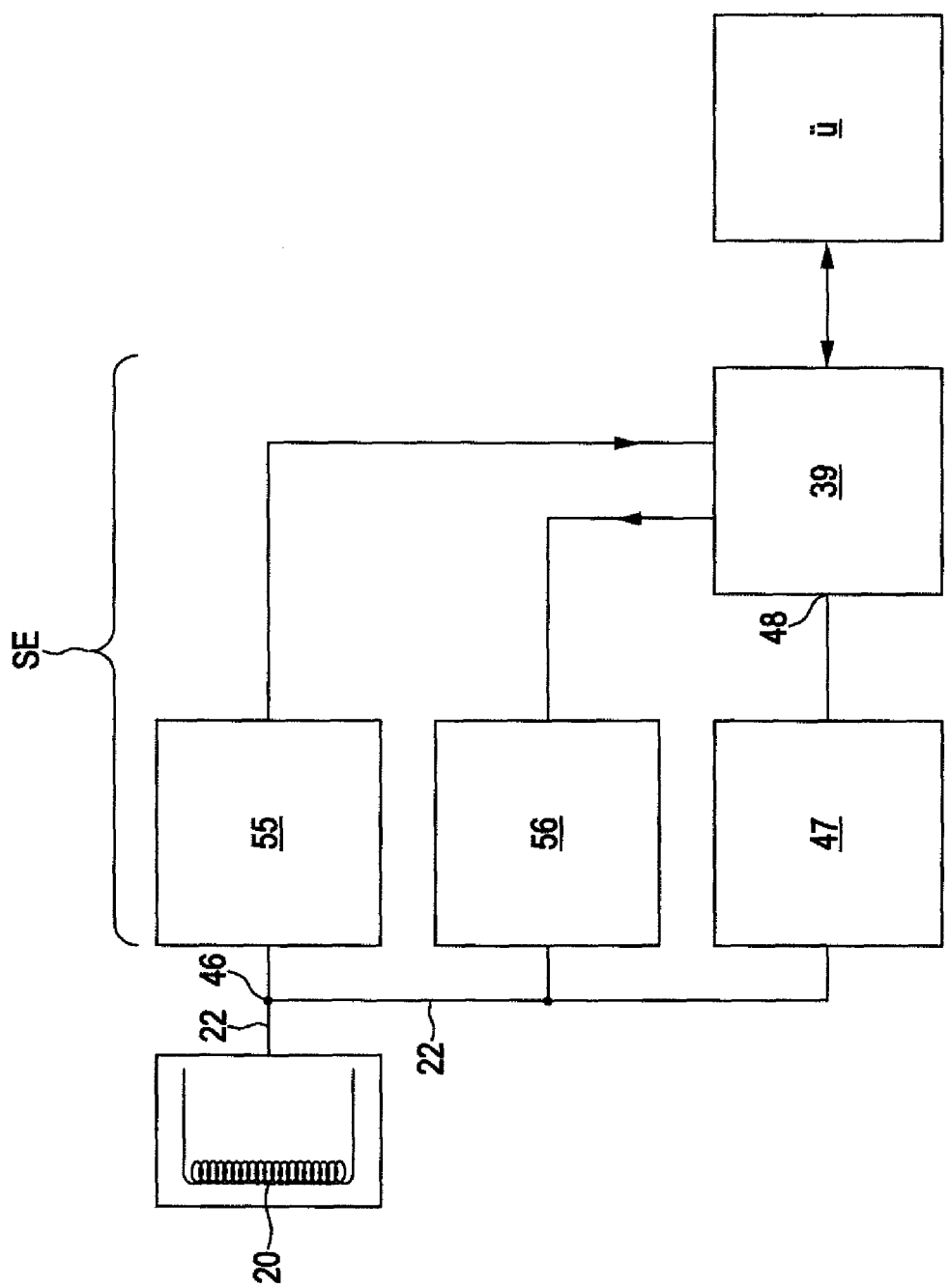
FIG. 5 shows a block diagram of the leaf-side secondary electronics of the apparatus.

The primary electronics PE (FIG. 4) has a primary processor 38 with an input 40 which serves for connecting to an energy supply source 41 via a switching regulator 54 that converts the voltage provided by the energy supply source 41 into the operating voltage of the primary processor 38. The latter can be (as shown in FIG. 3) an emergency-power-buffered output of a power supply unit 42 of an intrusion alarm control 43. It provides a direct-current supply voltage of, for example, 12V or 24V. The primary electronics PE comprises an inverter 52 which converts the direct-current input voltage into an alternating voltage of, for example, 12V, and a carrier frequency of 100 kHz, suitable for acting on the first electrical coil 19. Since the input voltage can range between, for example, 6V to 30V, a switching regulator 54 is provided.

The primary processor 38 has connections 44 to which signals are applied from, for example, opening, breakthrough, locking and sabotage monitoring units and also control signals, for example, for actuating the locking bar of an alarm system AL. These control signals are converted into serial data sets by the primary electronics PE with the aid of a BUS system using, for example, protocols that comply with the RS 485 standard.

The primary processor 38 also comprises a watchdog WD that monitors the functions of the primary and secondary electronics and the components and systems connected thereto. In the case that a malfunction is detected, this is signalized to the alarm system so as to avoid triggering a false alarm when the malfunction occurs. The watchdog WD furthermore can initiate program instructions of the primary processor 38 for problem solving.

The primary electronics PE furthermore comprises a modulator 53 by means of which the carrier frequency is modulated through the data sets to be transmitted. The modulated carrier voltage is applied at an output connection 45 and is fed to the first electrical coil 19 via the electrical line 17.

In the second electrical coil 20, a secondary voltage is induced and is fed via the electrical line 22 to a connection 46 of the secondary electronics SE. The latter comprises a demodulator 55 which demodulates the secondary voltage modulated by the signals and transmits the signals to a secondary processor 39, for example, of an opening, breakthrough, locking or sabotage monitoring unit Ü. Sensors and devices for status queries and for actuation are connected to the secondary processor 39 via in/out lines.

The secondary processor 39 is connected to an energy supply source 47 which, for example, provides a direct-current voltage of 5V at an input 48. The secondary electronics SE comprises an inverter that converts this input voltage into a 12V alternating voltage with a suitable frequency of, for example, 100 kHz. Energy supply to the secondary electronics SE takes place via a supply voltage inductively generated in the second electrical coil 20.

The secondary electronics SE, in turn, furthermore comprises a modulator 56 which, in a manner enabling a primary-side demodulation, converts signals provided via connections 49 by the sensors of the aforementioned monitoring devices into serial signal packets. The carrier voltage modulated in this manner is applied to the second electric coil 20 via the electric line 22. The alternating voltage induced through this in the first electrical coil 19 is fed via the electrical line 17 to the primary electronics PE and is demodulated therein in a demodulator 57, and is fed to the alarm system via the connections 44.

The bidirectional data transmission created in this manner takes place with an 8 bit resolution and a transmission rate of, for example, 2400 baud.

In order to increase sabotage protection, the primary electronics PE transmits a control signal packet within a time interval of 40 ms via the electrical lines 17, 22 and the first and second electrical coils 19, 20 to the secondary electronics SE. The latter acknowledges the receipt by retransmitting a response control signal packet to the primary electronics PE within this time interval. A further transmission cycle of control and response control signals furthermore takes place within this time interval. If, within this time interval, the primary electronics PE does not receive at least one response control signal, an interference signal is generated at an output connection 44 of the primary electronics PE, which interference signal can be used for interference or alarm triggering.

The primary electronics PE and the secondary electronics SE are accommodated in mechanically robust housings 50, 51 of high thermal conductivity, which are illustrated only schematically in FIG. 2.

The housing 50 of the primary electronics PE is installed in a wall-side frame profile and the housing 51 of the secondary electronics SE is installed in a leaf profile. Installation is carried out (as can be seen in FIG. 2) from the profile sides that face one another when the door leaf is closed. Due to this measure, the housings 50, 51 are not visible from the outside and can be protected against manipulation by a sabotage contact that generates an alarm signal in the event of a removal attempt.

In order to nevertheless further increase security against sabotage, the primary electronics PE and the secondary electronics SE are to be provided with means for mutual authentication so that an unnoticed replacement of a primary or secondary electronics PE, SE with a previously manipulated electronics is made extremely difficult.

The above-described exemplary embodiment of the apparatus according to the present invention serves primarily for signal transmission. The electrical power required for operating the secondary electronics is also inductively induced in the second electric coil 20. The electric power required for actuating the secondary-side apparatuses is, however, usually higher than the power that can be induced by the primary electrical coil 19 into the second electrical coil 20 while maintaining the signal transmission. In this case, a separate electrical power supply is necessary for actuating the secondary-side apparatuses.

Figure 6:
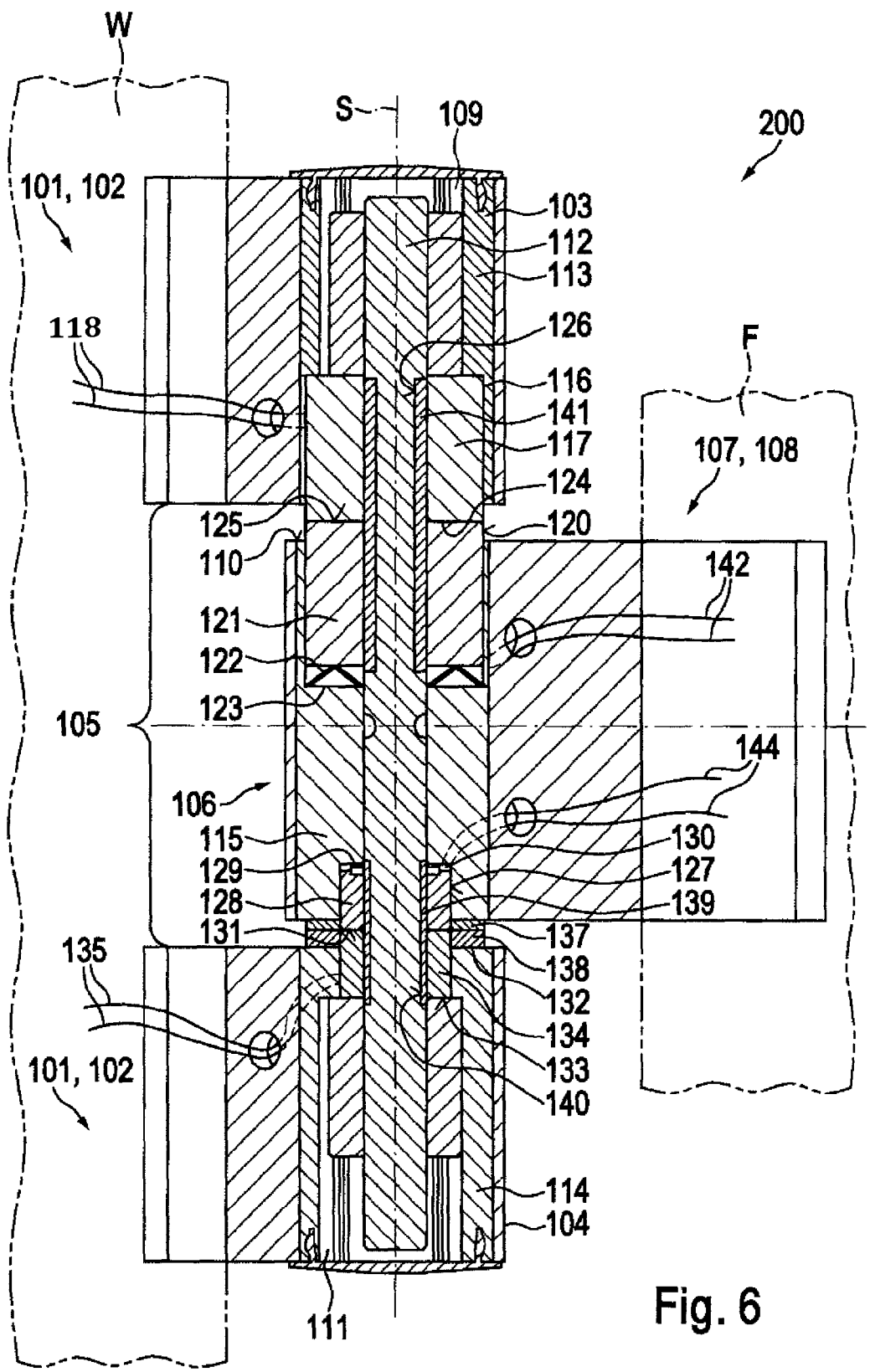
FIG. 6 shows an illustration of a longitudinal section through the hinge axis S of an embodiment of an apparatus that, at the same time, has the function of a conventional hinge plate.

This electrical power supply in the exemplary embodiment of the apparatus illustrated in FIG. 6 ff., which as a whole is designated by 200, likewise takes place through inductive coupling. This apparatus 200 is configured as a so-called three-piece hinge plate. It comprises a frame hinge plate part 101 which forms a hinge plate part 102 of the apparatus 200, and which serves for fixing to a stationary wall W or a stationary frame. The frame hinge plate part 101 has two hinge parts 103, 104 that are spaced apart from one another in the longitudinal direction of a hinge axis S by a clearance space 105.

In the clearance space 105 between the upper hinge part 103 and the lower hinge part 104, the leaf hinge part 106 of a leaf hinge plate part 107 is arranged which, in the exemplary embodiment illustrated in FIG. 6, forms a leaf part 108 that can be fastened to the leaf F.

The hinge axis S is defined by a hinge plate pin 112 that penetrates the hinge parts 103, 104 and 106 in pin receptacles 109, 110 and 111. The hinge plate pin is mounted in a known manner in the hinge plate pin receptacles 109, 111 of the hinge parts 103, 104 of the frame hinge plate part 101 and is adjustable perpendicular to the hinge axis S by means of bearing bushes 113, 114 that are made from a plastic material.

A bearing bush 115 which is made from a plastic bearing material serves to mount the hinge plate pin 112 in the hinge plate pin receptacle 110 of the leaf hinge part 106.

In its region facing toward the leaf hinge part 106, the bearing bush 113 of the upper frame hinge part 103 has a recess 116 which is arranged rotationally symmetric about a hinge axis S and in which the (electrical) primary power coil 117 is inserted. The latter is connected to a power voltage supply 119 (see FIG. 3) by means of two electrical connection cables 118.

On the side facing toward the primary power coil 117, the bearing bush 115 of the leaf hinge part 106 likewise comprises a recess 120 into which the (electrical) secondary power coil 121 is fitted which is structured in a manner corresponding to the primary power coil 117.

The secondary power coil 121 is mounted displaceable in the direction of the hinge axis S in the recess 120 and is supported via a spring element 122 on the bottom 123 of the recess 120 so that the opposing front sides 124, 125 of the primary and secondary power coils 117, 121 rest against one another.

The primary and secondary power coils 117, 121 have an outer diameter that almost corresponds to the inner diameter of the bearing bushes 113, 115. Through this, the cross-sectional area defined through the dimensions of the upper frame hinge part 103 and the leaf hinge part 106 are utilized at best by the primary and secondary power coils 117, 121 in order to maximize the electrical power that can be inductively transmitted from the primary power coil 117 into the secondary power coil 121.

For the purpose of improving coupling of primary and secondary power coils 117, 121 and for increasing security against burglary and sabotage, as described below, the hinge plate pin 112 has a constriction 126 extending over the length over which it is overlapped by the primary and secondary power coils 117, 121. In this constriction, a sleeve core 141 is inserted which comprises two half-shells made of a sintered ferrite material, for example, on the basis of manganese-zinc-ferrite powder. The hinge plate pin 112 comprising the sleeve core 141 thus serves as a magnetic flux guide element.

In the region of leaf hinge part 106, which region faces the secondary power coil 121, a further recess 127 arranged rotationally symmetric to the hinge axis S is incorporated in the bearing bush 115. Said recess 127 serves for receiving a signal transmitting coil 128 which is also designated as "second coil". The signal transmitting coil 128, in turn, is received in the recess 127 and is displaceable in the direction of the hinge axis S and is supported on the bottom 129 of the recess by means of a spring element 130. The signal transmitting coil 128 is connected to a secondary electronics unit SE by means of connection cables 144.

The signal transmitting coil 128 rests with the front side 131 located opposite to the spring element 130 against a front side 132 of a further signal transmitting coil 134, also called "first coil", which is mounted in a corresponding recess 133. The signal transmitting coil 134 is connected to a primary electronics PE by means of connection cables 135 (see FIG. 3). The mode of operation and configuration of the signal transmitting coils and of the primary and secondary electronics correspond to those explained based on apparatus 100.

Sliding disks 137, 138 are provided between the lower frame hinge part 104 and the leaf hinge part 106 so as to reduce wear caused by pivoting the hinge plate.

Figure 7:
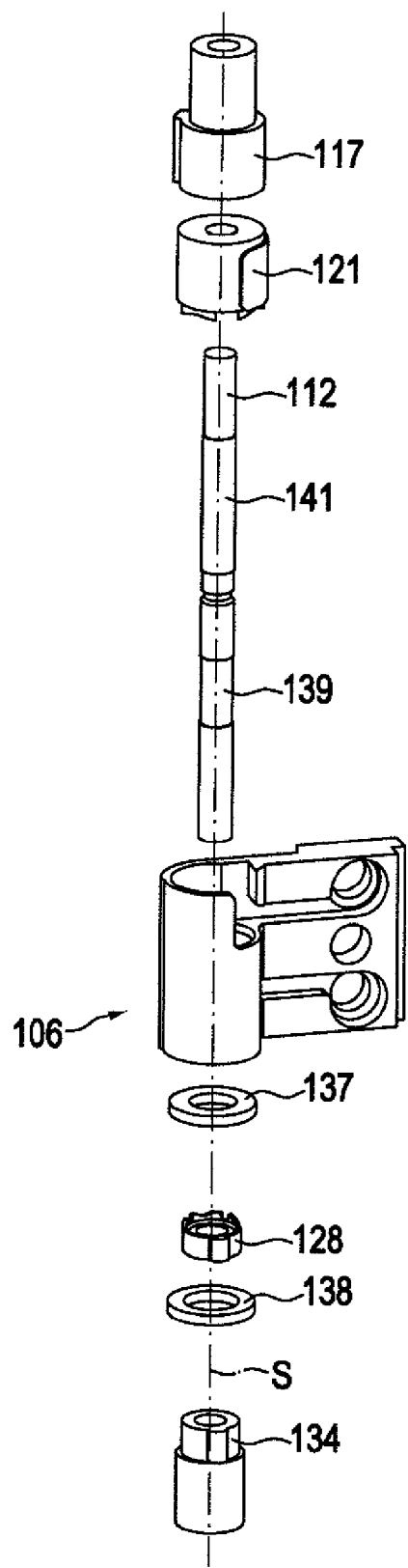
FIG. 7 shows the leaf hinge plate part of an embodiment in a perspective detailed illustration that also comprises representations of the coils provided in the frame hinge plate part.
Figure 8:
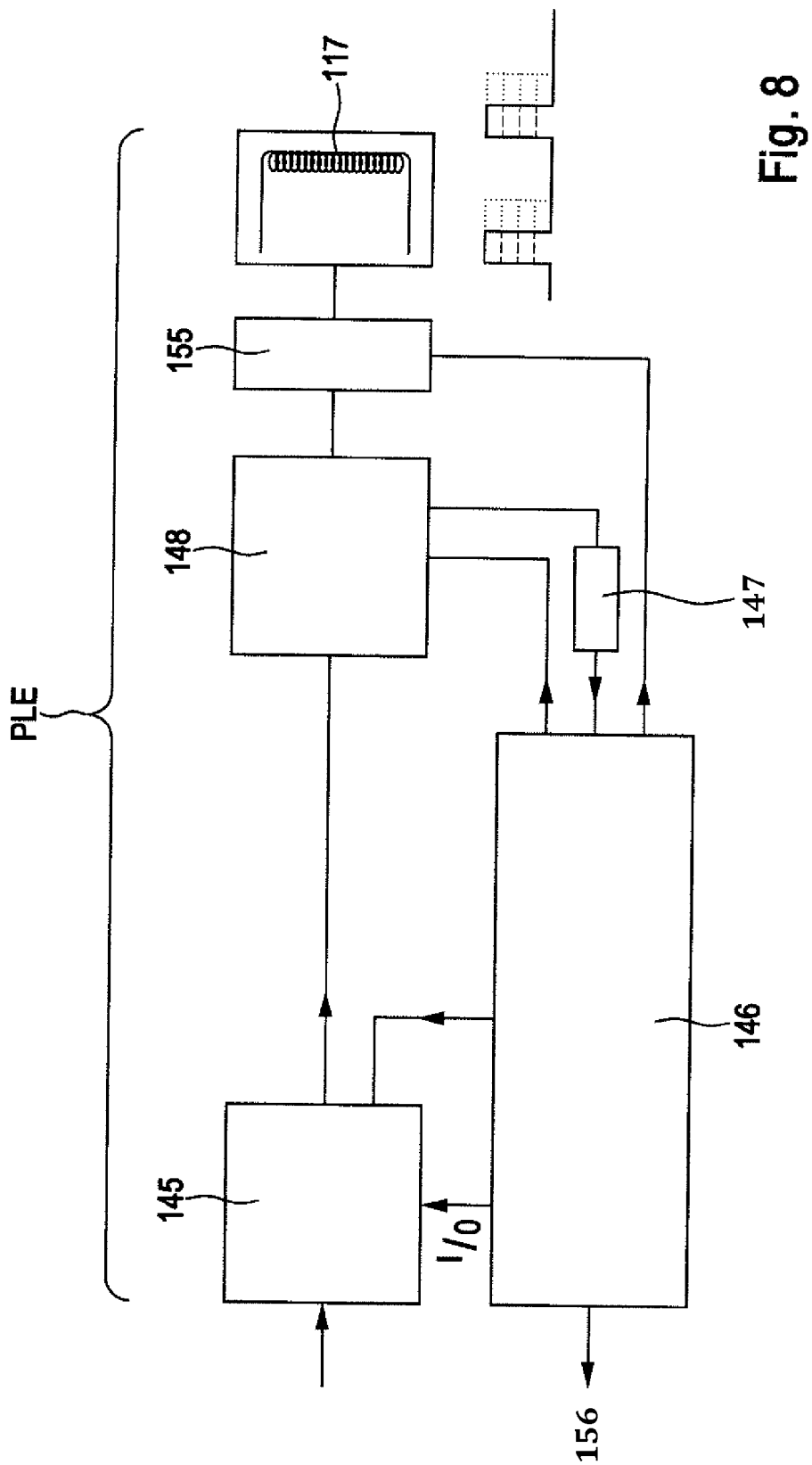
FIG. 8 shows a block diagram of the frame-side power electronics of an embodiment.

As is in particular shown in FIGS. 6 and 7, the signal transmitting coils 128, 134 have significantly smaller dimensions than the primary and secondary power coils 117, 121 since, for signal transmission, smaller coil volumes are sufficient. The sleeve 139 provided in the overlapping region of the signal transmitting coils 128, 134, again in a constriction 140 of the hinge plate pin 112, and consisting of two half-shells made of a sintered ferrite material, for example on the basis of a manganese-zinc-ferrite powder, is provided with a significantly smaller wall thickness than the sleeve core 141 so that overall the region of the signal transmission coils is suitable for transmitting higher mechanical forces between the wall or frame and the leaf than the region of the primary and secondary power coils 117, 121. The configuration of the apparatus 200 with two separate pairs of coils for power and signal transmission thus is in itself pertinent to the present invention.

A power supply unit of an intrusion alarm control provides a direct-current power voltage of, for example, 12V or 24V. The voltage is applied to a switching regulator 145 which converts this voltage into a supply voltage suitable for generating a required secondary power voltage. The value of the voltage is usually constant between 14V and 36V. Arranged downstream of the switching regulator 145 are a demodulator 147 and an inverter 148 which both are also connected to the primary power processor 146. The inverter 148 converts the output voltage of the switching regulator 145 into a, for example, square-wave alternating voltage which is suitable for acting on the primary power coil 117 and which, in the illustrated exemplary embodiment, is 14-36 V and has a frequency of 40 kHz and is applied via an on/off switch 155 to the primary power coil 117. In the secondary power coil 121 (except for transmission losses and phase shifts) an approximately corresponding secondary power voltage is induced which is fed to a secondary power electronics SLE (see FIG. 3) by means of cables 142 (also designated as line).

Figure 9:
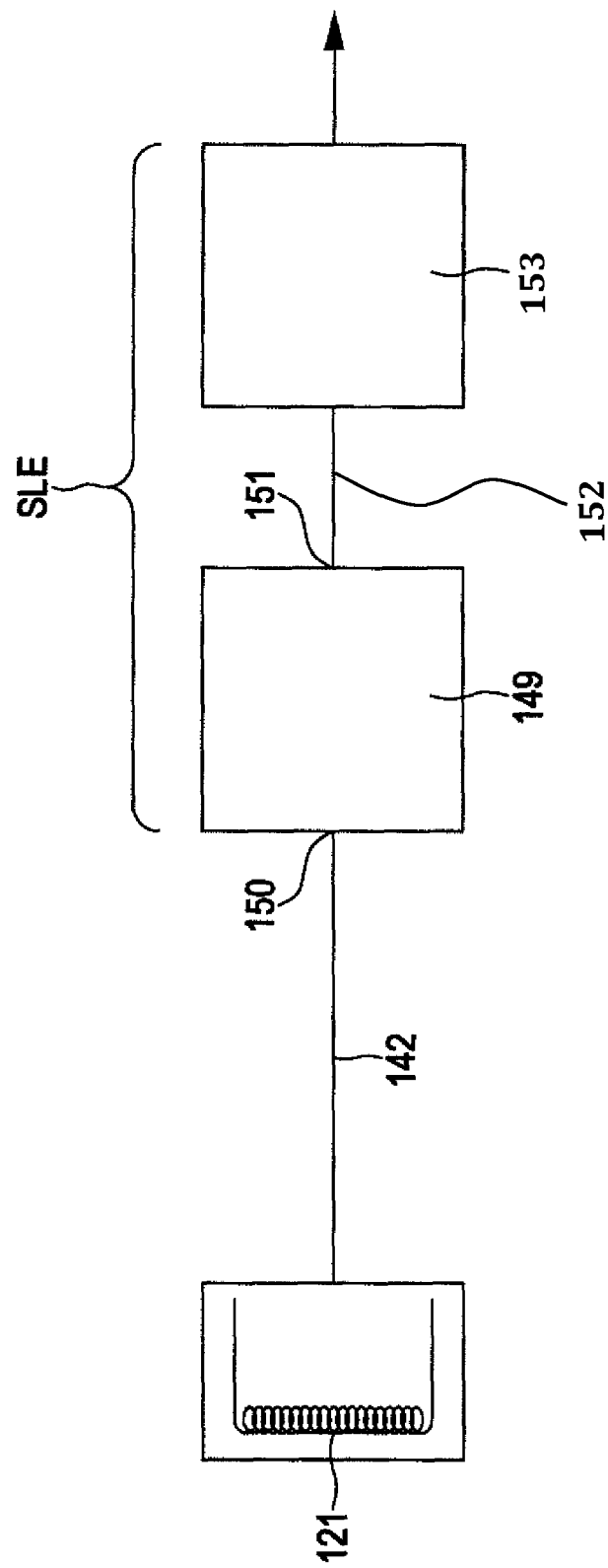
FIG. 9 shows a block diagram of the leaf-side secondary power electronics of an embodiment.

The secondary power voltage is applied to an input 150 of a rectifier 149 which serves for providing a direct-current power voltage at its output 151 for actuating the secondary-side apparatus provided in or on the leaf (see FIG. 9). The power voltage is applied via a line 152 to a secondary power processor 153. The latter measures the voltage value applied.

A modulator generates an amplitude-modulated electrical signal in the 2 kHz frequency range (2K band), which signal depends on the voltage value and is applied to the secondary power coil 121 via the cables 142.

This amplitude-modulated signal induces in the primary power coil 117 a secondary power-voltage-dependent signal with which the primary power processor 146 is activated via the demodulator 147. The primary power processor 146 performs a setpoint/actual value comparison with regard to the secondary power voltage and controls the switching regulator 145 or the inverter 148 in the sense of an adjustment. Due to this measure, it is provided that the electrical power required for actuating the leaf-side apparatuses is always available on the secondary side.

The above-described configuration of the primary and secondary power electronics PLE, SLE can be utilized in an inventive manner for improving the sabotage protection. It was surprisingly found that already a minor displacement of the hinge plate pin 112 and thus also of the sleeve core 141 from its position, which is symmetrical to the primary and secondary power coils 117, 121, results in such a disturbance of the system including primary and secondary power coil 117, 121 and sleeve core 141 that for achieving a desired secondary-side electrical power, a significantly higher primary-side electrical power is required. Pulling out the hinge plate pin for the purpose of burglary or sabotage can therefore be detected by determining the required primary power and can be utilized for generating an alarm signal at an output 156 of the primary power electronics. An improvement of burglary and sabotage protection is therefore achievable due to the above-described measures without the need for a bidirectional exchange of control data packets.

The present invention is not limited to embodiments described herein; reference should be had to the appended claims.

REFERENCE NUMERALS

- 100 Apparatus
- 1 Hinge plate part
- 2, 2' Hinge parts
- 3 Clearance space
- 4 Hinge part
- 5 Leaf part
- 6, 6' Hinge plat fastening parts
- 7 Leaf fastening parts
- 8 Hinge plate pin
- 17 Electrical line
- 18 Helical spring
- 19 First electrical coil
- 20 Second electrical coil
- 21 Helical spring
- 22 Electrical line
- 38 Primary processor
- 39 Secondary processor
- 40 Input
- 41 Energy supply source
- 42 Power supply unit
- 43 Intrusion alarm control
- 44 Output connections
- 45 Output connection
- 46 Connection
- 47 Energy supply source
- 48 Input
- 49 Connections
- 50 Housing
- 51 Housing
- 52 Inverter
- 53 Modulator
- 54 Switching regulator
- 55 Demodulator
- 56 Modulator
- 57 Demodulator
- F Leaf
- R Frame
- S Hinge axis
- PE Primary electronics
- AL Alarm system
- SE Secondary electronics
- Ü Monitoring unit
- 200 Apparatus
- 101 Frame hinge plate part
- 102 Hinge plate part
- 103 Hinge part
- 104 Hinge part
- 105 Clearance space
- 106 Leaf hinge part
- 107 Leaf hinge plate part
- 108 Leaf part
- 109 Pin receptacle
- 110 Pin receptacle
- 111 Pin receptacle
- 112 Hinge plate pin
- 113 Bearing bush
- 114 Bearing bush
- 115 Bearing bush
- 116 Recess
- 117 Primary power coil
- 118 Connection cable
- 119 Power voltage supply
- 120 Recess
- 121 Secondary power coil
- 122 Spring element
- 123 Bottom
- 124 Front side
- 125 Front side
- 126 Constriction
- 127 Recess
- 128 Signal transmitting coil
- 129 Bottom
- 130 Spring element
- 131 Front side
- 132 Front side
- 133 Recess
- 134 Signal transmitting coil
- 135 Connection cables
- 136 Primary electronics
- 137 Sliding disk
- 138 Sliding disk
- 139 Sleeve
- 140 Constriction
- 141 Sleeve core
- 142 Cables
- 144 Cable
- 145 Switching regulator
- 146 Primary power processor
- 147 Demodulator
- 148 Inverter
- 149 Rectifier
- 150 Input
- 151 Output
- 152 Line
- 153 Secondary power processor
- 155 Switch
- 156 Output
- F Leaf
- S Hinge axis
- W Wall
- WD Watchdog
- PLE Primary power electronics
- SLE Secondary power electronics

The invention claimed is:

1. A method for a contactless transmission of electrical energy between a wall and a leaf fastened to the wall, the method comprising:
   providing a leaf fastened to a wall, the leaf being configured so as to be hingedly mounted about a hinge axis;
   providing a hinge plate pin;
   providing a primary power coil fastened to the wall;
   providing a secondary power coil fastened to the leaf, the primary power coil and the secondary power coil being configured so as to be in an inductive operative connection with each another via the hinge plate pin;

detecting an actual secondary power voltage induced in the secondary power coil;

comparing the actual secondary power voltage with a setpoint value of the secondary power voltage;

influencing a primary power applied to the primary power coil based on the comparison of the setpoint value and the actual secondary power voltage;

detecting the primary power required to achieve the setpoint value of the secondary power voltage; and triggering a signal when a predetermined primary power is exceeded.

2. The method as recited in claim 1, further comprising:

converting the actual secondary power voltage detected into a value-dependent modulated electrical signal; and inducing in the primary power coil a demodulatable secondary-power-voltage-dependent signal by having the value-dependent modulated electrical signal act on the secondary power coil.

3. The method as recited in claim 2, further comprising:

demodulating the demodulatable secondary-power-voltage-dependent signal so as to obtain a demodulated secondary-power-voltage-dependent signal; and activating a device so as to influence the primary power via the demodulated secondary-power-voltage-dependent signal.

4. An apparatus for a contactless transmission of electrical energy between a wall and a leaf fastened to the wall so as to be hingedly mounted about a hinge axis, the apparatus comprising:

a primary power coil fastened to a wall, a secondary power coil fastened to a leaf;

a hinge plate pin configured to serve as a magnetic flux guide element arranged between the primary power coil and the secondary power coil;

a secondary-side modulator configured to act on the secondary power coil with a secondary-voltage-dependent modulated signal;

a primary-side demodulator configured to demodulate a signal induced in the primary power coil via the secondary-voltage-dependent modulated signal;

a first device configured to influence a primary power;

a second device configured to determine a deviation between a setpoint value of a secondary power voltage and an actual secondary power voltage; and a third device configured to trigger a signal when a predetermined primary power is exceeded.

5. The apparatus as recited in to claim 4, wherein the first device comprises at least one of a switching regulator and an inverter comprising a pulse width modulator.

6. The apparatus as recited in claim 4, further comprising a primary power electronics comprising a primary power processor, wherein the second device is arranged in the primary power electronics.

7. The apparatus as recited in claim 6, further comprising a rectifier and a secondary power processor, the rectifier being configured to convert the secondary power voltage induced in the secondary power coil into a direct-current voltage, and being connected to the secondary power processor so as to transmit a direct-current voltage value.

8. The apparatus as recited in claim 7, wherein the secondary power processor is operatively connected to the secondary-side modulator.

9. The apparatus as recited in claim 6, wherein the primary power electronics comprises an inverter.

\* \* \* \* \*